(12) United States Patent
Ogawa et al.

(10) Patent No.: US 10,086,893 B2
(45) Date of Patent: Oct. 2, 2018

(54) STRADDLE-TYPE SEAT

(71) Applicant: TS TECH CO., LTD., Asaka-shi, Saitama (JP)

(72) Inventors: Tatsuro Ogawa, Tochigi (JP); Yuichi Honma, Tochigi (JP); Haruhiko Kawada, Tochigi (JP); Tomokazu Kuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/266,533

(22) Filed: Sep. 15, 2016

(65) Prior Publication Data

US 2017/0088208 A1 Mar. 30, 2017

(30) Foreign Application Priority Data

Sep. 24, 2015 (JP) ................................. 2015-187222

(51) Int. Cl.
 *B62J 1/28* (2006.01)
 *B62J 1/12* (2006.01)
 *B62J 27/00* (2006.01)

(52) U.S. Cl.
 CPC . *B62J 1/28* (2013.01); *B62J 1/12* (2013.01); *B62J 27/00* (2013.01)

(58) Field of Classification Search
 CPC .......... B62J 1/28; B62J 1/10; B62J 1/12; B62J 27/00
 See application file for complete search history.

(56) References Cited

U.S. PATENT DOCUMENTS

| 4,765,432 A | * | 8/1988 | Odom | B62J 1/12 |
| | | | | 180/227 |
| 6,224,081 B1 | | 5/2001 | Wayman et al. | |
| 7,621,362 B2 | * | 11/2009 | Ogawa | B62J 1/08 |
| | | | | 180/219 |
| 8,757,713 B2 | * | 6/2014 | Reinhardt | B62J 1/28 |
| | | | | 180/219 |
| 9,682,737 B2 | * | 6/2017 | Mori | B62J 1/28 |
| 2010/0168958 A1 | * | 7/2010 | Baino | B62J 6/02 |
| | | | | 701/36 |
| 2011/0193375 A1 | * | 8/2011 | Dohmen | B62J 1/02 |
| | | | | 297/195.1 |
| 2016/0090137 A1 | * | 3/2016 | Mori | B62J 1/28 |
| | | | | 701/49 |

FOREIGN PATENT DOCUMENTS

JP 2014-202446 * 9/2014

* cited by examiner

*Primary Examiner* — Philip F Gabler
(74) *Attorney, Agent, or Firm* — Drinker Biddle & Reath LLP

(57) ABSTRACT

A seat to be provided on a vehicle such as an automotive two-wheeled vehicle includes a seat body on which a rider rides, a backrest arranged at a rear side of the seat body, and an electric upward and downward movement mechanism configured to move the backrest upward or downward based on at least one of an acceleration of the vehicle or operation information for controlling the acceleration. The upward and downward movement mechanism includes a link mechanism, which connects a lower portion of the seat body and the backrest together, and an electric actuator, which is configured to input force to at least one of links included in the link mechanism.

19 Claims, 15 Drawing Sheets

STRADDLE-TYPE SEAT

CROSS-REFERENCE TO RELATED APPLICATIONS

This application is based upon and claims the priority benefit of Japanese Patent Application No. JP2015-187222, filed Sep. 24, 2015, the contents being incorporated herein by reference.

BACKGROUND

The present disclosure relates to a straddle-type seat which has a movable backrest.

In a straddle-type seat to be provided on a vehicle such as an automotive two-wheeled vehicle or an automotive three-wheeled vehicle, a movable backrest may be arranged on a rear portion of a seat body on which a rider is to ride astride. In U.S. Pat. No. 6,224,081, for example, there is provided a mechanism to raise a horizontally-arranged backrest upright by manual lever operation.

When the backrest is consistently kept at the raised position, the backrest may obstruct a rider when he or she mounts or dismounts the vehicle. When the backrest is not kept at the raised position, on the other hand, the buttocks of the rider may fall off a rear end of a straddle-type seat upon acceleration of the vehicle. However, the state of acceleration of the vehicle frequently changes, and therefore it is difficult to manually operate and move the backrest during driving.

SUMMARY

The present disclosure has been made in view of the above-described problem. An embodiment of the present disclosure provides a straddle-type seat that can control a supported state of the buttocks of a rider, which are supported by a backrest, based on the state of an acceleration of a vehicle.

The above-described problem can be solved by a straddle-type seat according to an embodiment of the present disclosure, which is provided on a vehicle, the straddle-type seat including: a seat body on which a rider is to ride; a backrest arranged at a rear side of the seat body; and an electric upward and downward movement mechanism configured to move the backrest upward or downward based on at least one of an acceleration of the vehicle or operation information for controlling the acceleration.

According to an embodiment of the straddle-type seat, the backrest can be moved upward or downward based on the state of an acceleration of the vehicle. Therefore, the supported state of the buttocks of the rider can be adjusted in conjunction with the state of the acceleration of the vehicle. In addition, according to the aforementioned embodiment of the straddle-type seat, the backrest can be moved to an appropriate position based on the state of the acceleration without an operation that would otherwise be needed to move the backrest upward or downward.

Still further, in an embodiment of the straddle-type seat, the upward and downward movement mechanism may include a link mechanism connecting a lower portion of the seat body with the backrest and an electric actuator configured to input force to at least one of links included in the link mechanism. With the structure described above, the backrest can be moved upward or downward relative to the seat body by the electric link mechanism. The backrest can be moved by the link mechanism in this manner; thereby, a pivotal trajectory can be flexibly designed for the backrest.

Furthermore, in an embodiment of the straddle-type seat, the link mechanism may be configured to move the backrest upward or downward so that the backrest forms a pivotal trajectory with respect to the seat body. With the structure described above, the backrest can be moved upward or downward so it does not to interfere with the seat body. In addition, with the above structure, the length of the seat, including both the seat body and the backrest, can be prevented from being increased due to the link mechanism, thereby making it possible to construct a straddle-type seat having a reduced size and a movable backrest provided therewith.

Moreover, in an embodiment of the straddle-type seat, the backrest may be at substantially the same position in a front to back direction in respective cases where the backrest is at an upper limit position and at a lower limit position. With the structure described above, the distance between the seat body and the backrest does not change before and after a movement of the backrest, and therefore the supporting area for the buttocks of the rider can be changed while maintaining the same riding posture. In addition, the total length of the seat, including both the seat body and the backrest, does not change before and after the movement of the backrest, and therefore the seat can be inhibited from interfering with members arranged around the seat.

Further, in an embodiment of the straddle-type seat, the link mechanism may include a shaft rotatable about an axis thereof by the electric actuator, a first link rotatable about the shaft as an axis thereof, a second link arranged substantially in parallel with the first link, a third link connecting the first link and the second link together and fixed on the backrest, and a fourth link connecting the first link and the second link together and fixed on the lower portion of the seat body. With the structure described above, the link mechanism can be obtained as a four-bar parallel linkage mechanism and can be reduced in size.

Still furthermore, in an embodiment of the straddle-type seat, the operation information for controlling the acceleration may be an opening degree of an accelerator (e.g., throttle body) of the vehicle. With the structure described above, a positional adjustment of the backrest can be started before the vehicle accelerates. Therefore, the backrest can be promptly moved to an appropriate position based on the state of the acceleration of the vehicle.

Moreover, in an embodiment of the straddle-type seat, when the opening degree of the accelerator is equal to or greater than a threshold, the upward and downward movement mechanism may start to move the backrest upward, and, when a predetermined upward movement stopping condition has been satisfied, the upward and downward movement mechanism may preferably stop the upward movement of the backrest. With the structure described above, upon acceleration of the vehicle, the backrest can be moved upward, and in addition, the upward movement of the backrest can be automatically stopped. Therefore, upon acceleration of the vehicle, the buttocks of the rider can be surely supported by the backrest and the buttocks can be prevented from moving rearward.

Still moreover, in an embodiment of the straddle-type seat, the predetermined upward movement stopping condition may be at least one of conditions that an upper limit switch for the backrest is turned on, that the number of output pulses synchronized with rotation of a motor as a primary mover for the upward and downward movement mechanism reaches an upper limit, or that an overload on the motor is detected. With the structure described above, the backrest can be prevented from moving upward beyond the specified upper limit position while allowing the electric actuator to operate stably.

In an embodiment of the straddle-type seat, when the state in which the opening degree of the accelerator is below a threshold has continued for a predetermined time, the upward and downward movement mechanism may start to move the backrest downward, and when a predetermined downward movement stopping condition has been satisfied, the upward and downward movement mechanism may stop the downward movement of the backrest. With the structure described above, when the vehicle is not in a constant acceleration state, the backrest can be moved downward. In addition, the downward movement of the backrest can be automatically stopped. Therefore, the backrest has been moved downward when the rider rides on and off the straddle-type seat. As a consequence, the rider can more easily mount and dismount the straddle-type seat.

In an embodiment of the straddle-type seat, the predetermined downward movement stopping condition may be at least one of conditions that a lower limit switch for the backrest is turned on or that an overload on a motor as a primary mover for the upward and downward movement mechanism is detected. With the structure described above, the backrest can be prevented from moving downward beyond the specified lower limit position while allowing the electric actuator to operate stably.

According to an embodiment of the present disclosure, the supported state of the buttocks of the rider can be adjusted in conjunction with the state of an acceleration of the vehicle.

According to an embodiment of the present disclosure, the moving trajectory of the backrest can be flexibly designed.

According to another embodiment of the present disclosure, the backrest can be moved upward or downward without interference with the seat body.

According to still another embodiment of the present disclosure, the supporting area for the buttocks of the rider can be changed while maintaining the same riding posture.

According to a further embodiment of the present disclosure, the link mechanism can be obtained as a four-bar parallel linkage mechanism and can be reduced in size.

According to a still further embodiment of the present disclosure, the backrest can be promptly moved to an appropriate position based on the state of an acceleration of the vehicle.

According to a still further embodiment of the present disclosure, upon acceleration of the vehicle, the buttocks of the rider can be surely supported by the backrest and his or her buttocks can be prevented from moving rearward.

According to a yet further embodiment of the present disclosure, the backrest can be prevented from moving upward beyond the specified upper limit position while allowing the upward and downward movement mechanism to operate stably.

According to an even yet further embodiment of the present disclosure, the backrest has been moved downward when the rider rides on and off the straddle-type seat, and therefore the rider can easily mount and dismount the straddle-type seat.

According to a still even yet further embodiment of the present disclosure, the backrest can be prevented from moving downward beyond the specified lower limit position while allowing the upward and downward movement mechanism to operate stably.

BRIEF DESCRIPTION OF THE DRAWINGS

Various embodiments of the invention are illustrated in the drawings, in which.

DETAILED DESCRIPTION

Various embodiments of the present disclosure relate to a straddle-type seat to be provided on a vehicle, the straddle-type seat including: a seat body on which a rider is to ride; a backrest arranged at a rear side of the seat body; and an electric upward and downward movement mechanism configured to move the backrest upward or downward based on at least one of an acceleration of the vehicle or operation information for controlling the acceleration. In the following embodiment, the straddle-type seat according to the present disclosure is described taking, as an example, a case that it is applied to a seat to be mounted on an automotive two-wheeled vehicle provided with an electric motor as a primary mover (hereinafter referred to as "the seat"). However, the primary mover is not limited to the electric motor. For example, the straddle-type seat according to the present disclosure can be likewise applied to an automotive two-wheeled vehicle provided with an engine and a battery.

First, the structure of the seat 1 according to the present embodiment is described on the basis of FIG. 1 to FIG. 9.

Figure 1:
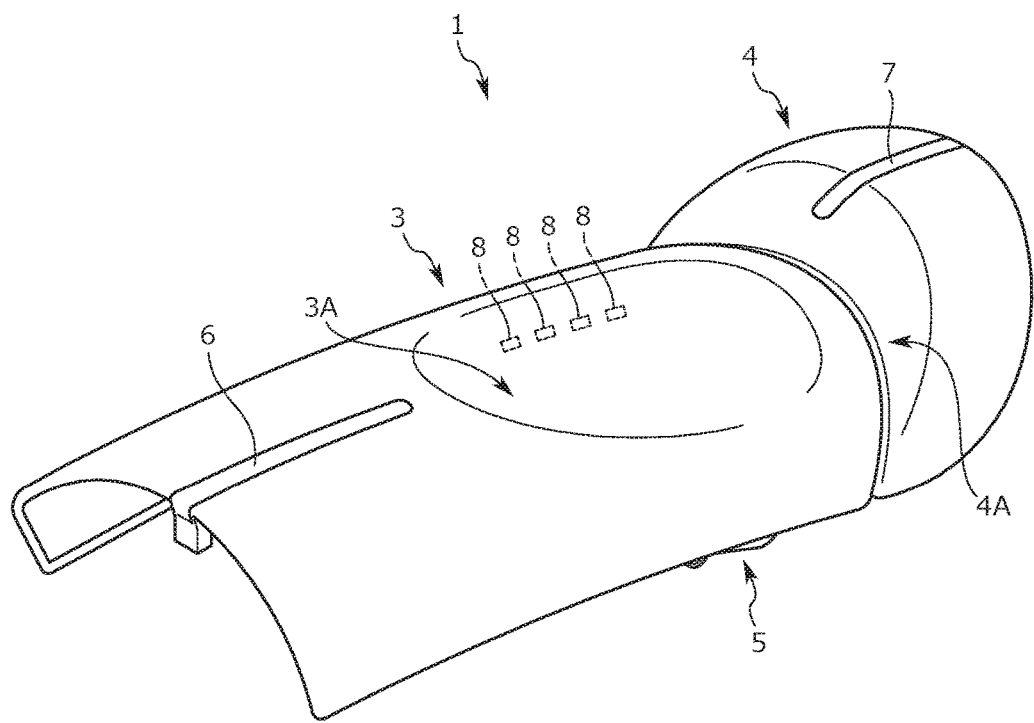
FIG. 1 is a perspective view of a seat according to an embodiment of the present disclosure for an automotive two-wheeled vehicle.
Figure 2:
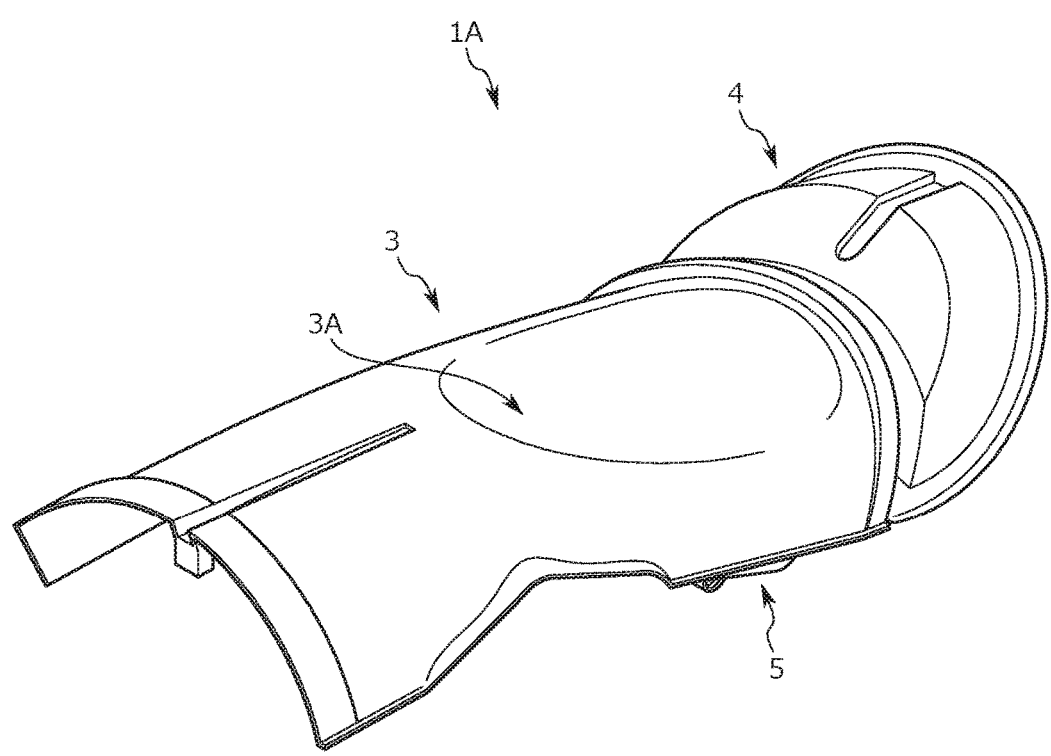
FIG. 2 is a perspective view of a frame of the seat for the automotive two-wheeled vehicle.
Figure 3:
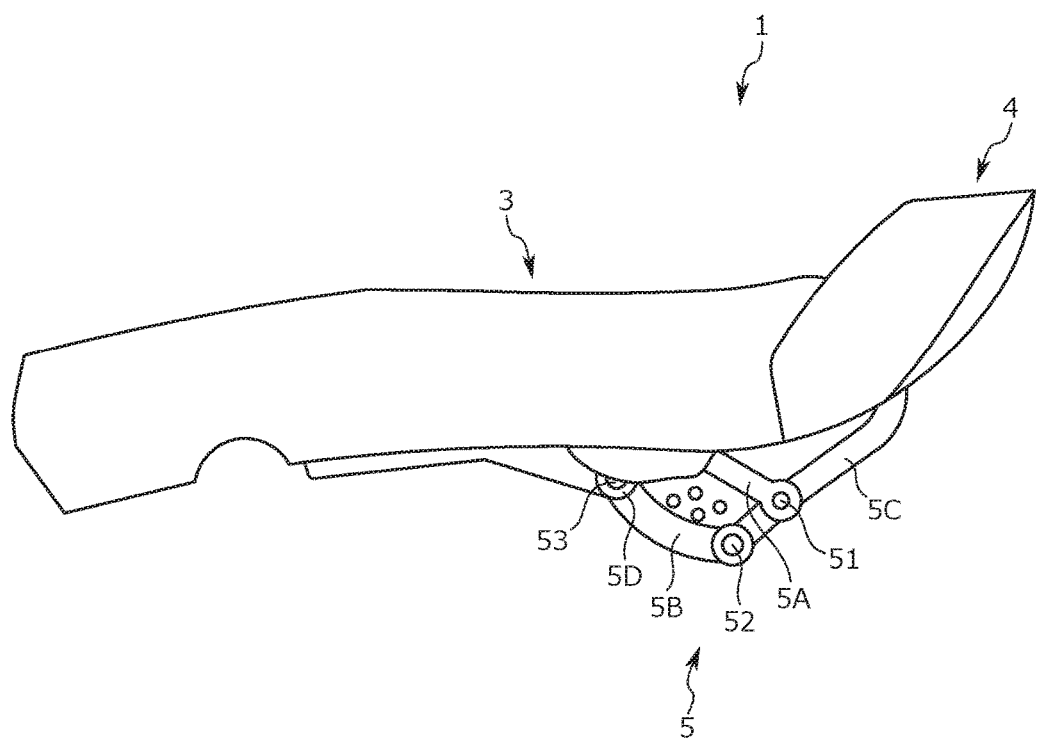
FIG. 3 is a side view of the seat for the automotive two-wheeled vehicle.
Figure 4:
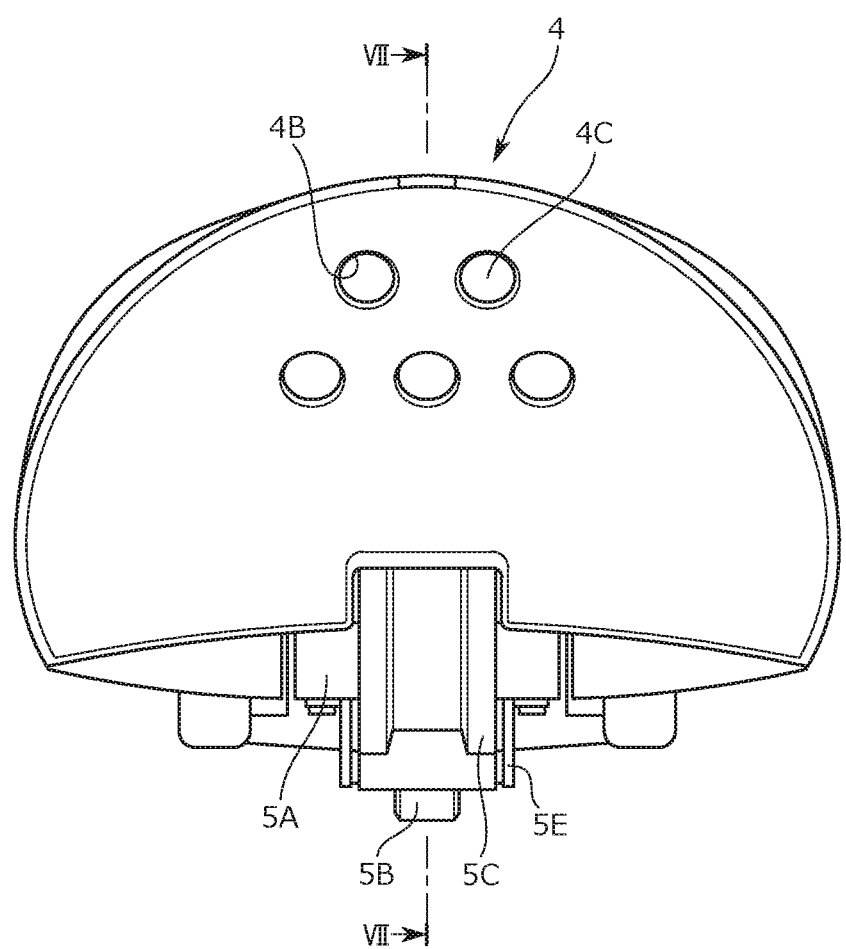
FIG. 4 is a rear view of the seat for the automotive two-wheeled vehicle.
Figure 5:
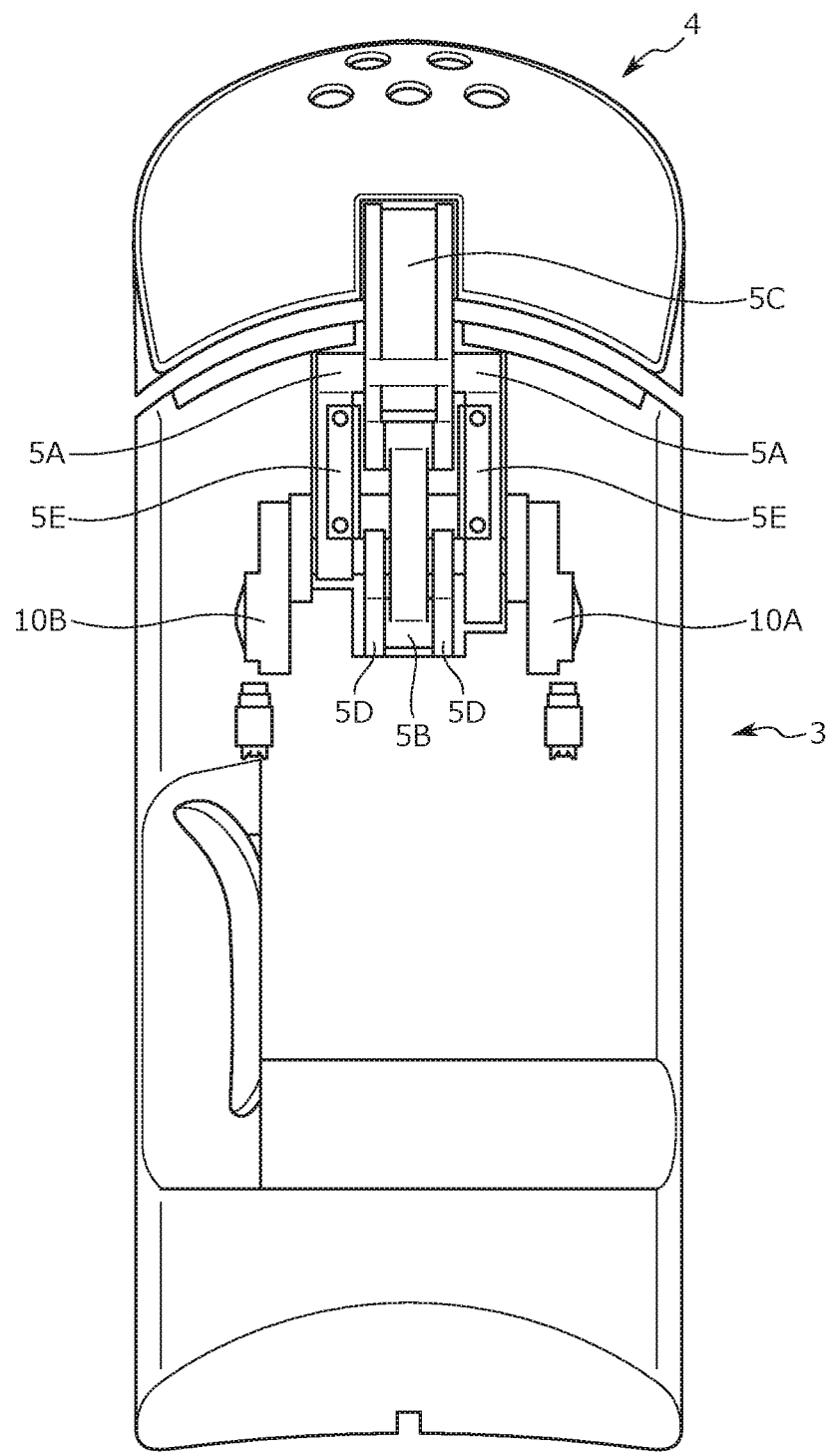
FIG. 5 is a bottom view of the seat for the automotive two-wheeled vehicle.

FIG. 1 is a perspective view of the seat 1. FIG. 2 is a perspective view of a seat frame 1A of the seat 1 with a surface material removed therefrom. FIG. 3 is a side view of the seat 1 as viewed at a side wall thereof. FIG. 4 is a rear view of the seat 1 as viewed from a rear thereof. FIG. 5 is a bottom view of the seat 1 as viewed from a bottom wall thereof.

Figure 6:
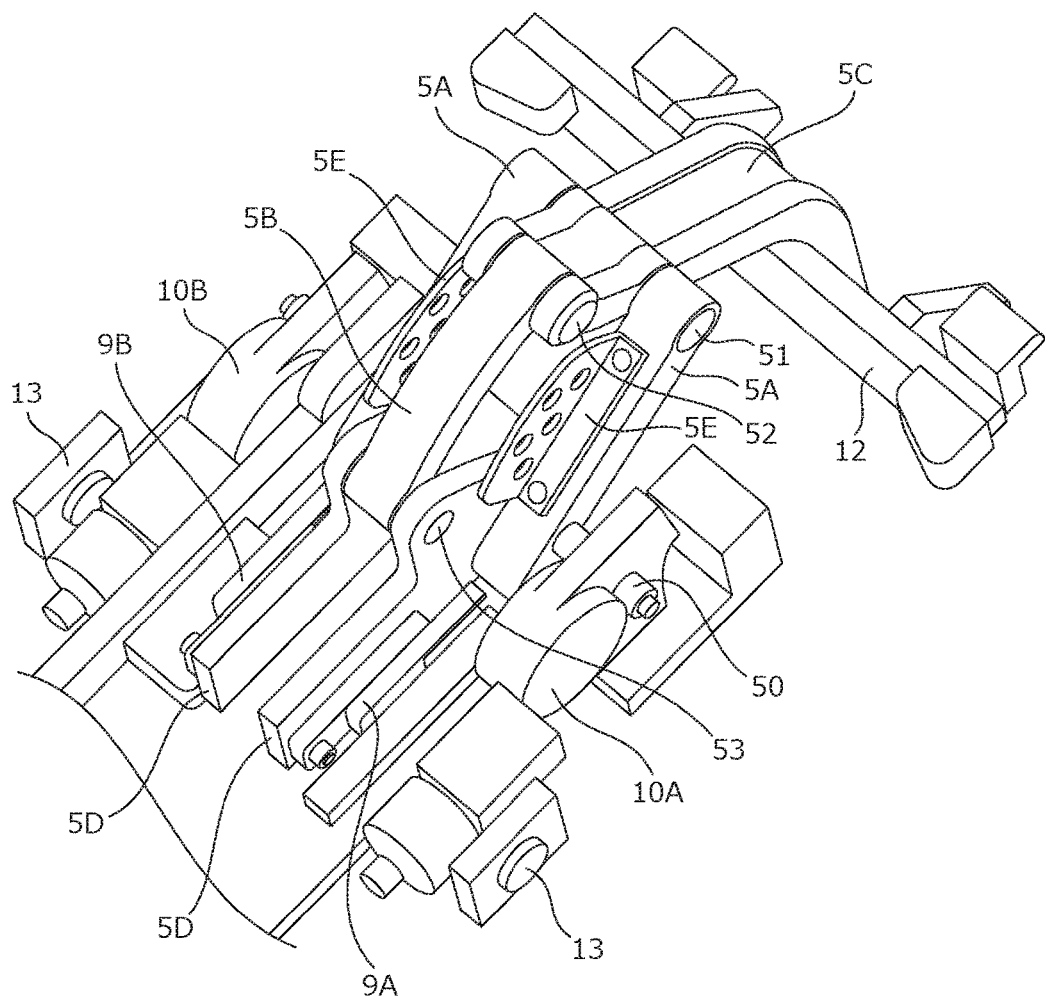
FIG. 6 is an internal structure view of the seat for the automotive two-wheeled vehicle, illustrating the structure of a link mechanism.
Figure 7:
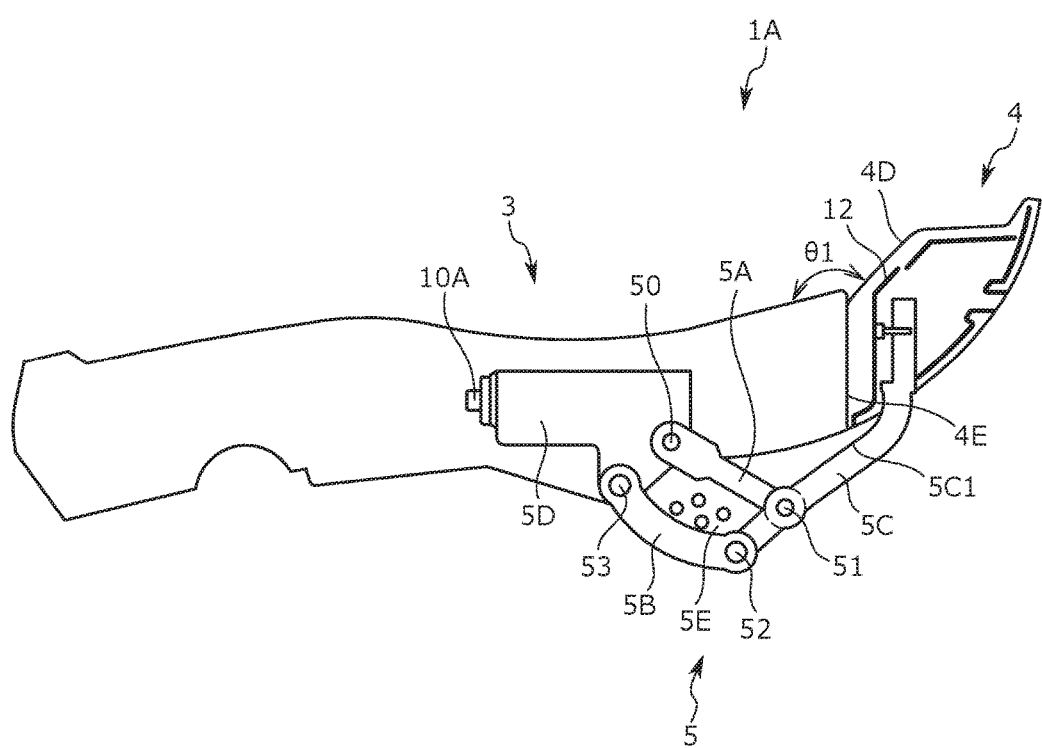
FIG. 7 is a cross-sectional view of the seat for the automotive two-wheeled vehicle in a state where a backrest is at a lower limit position.
Figure 8:
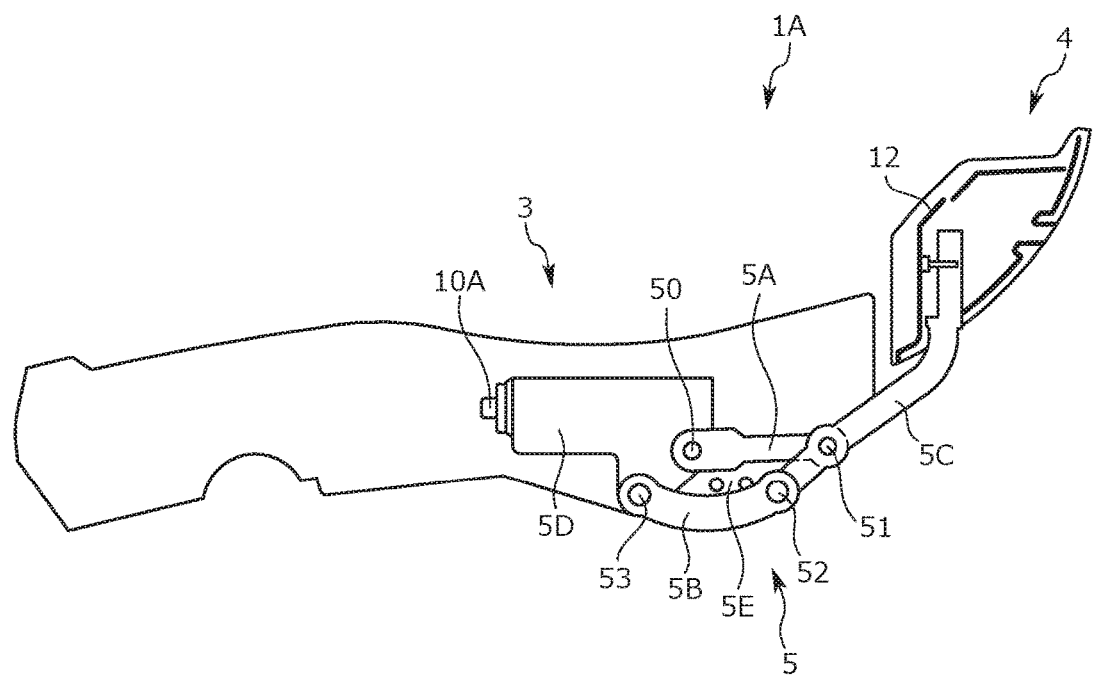
FIG. 8 is a cross-sectional view of the seat for the automotive two-wheeled vehicle in a state where the backrest has moved upward.
Figure 9:
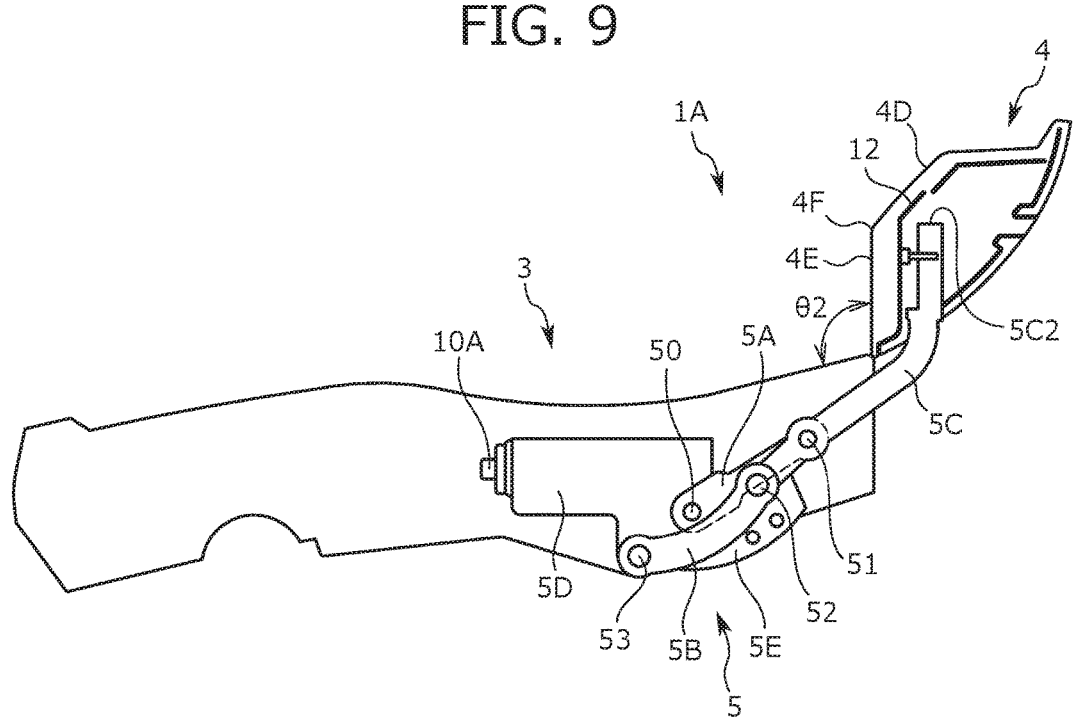
FIG. 9 is a cross-sectional view of the seat for the automotive two-wheeled vehicle in a state where the backrest is at an upper limit position.

FIG. 6 is an internal structure view of the seat 1, illustrating the structures of link mechanisms 5 that function as upward and downward movement mechanisms for moving a backrest 4 upward or downward. FIG. 7 is a cross-sectional view taken along the line VII-VII of FIG. 4. FIG. 8 and FIG. 9 are cross-sectional views each corresponding to FIG. 7 and illustrating a case where the backrest 4 has been moved upward by the link mechanisms 5. It is noted that for the brevity of description, like portions in the seat 1 and seat frame 1A is described with like terms and reference numerals applied thereto.

As shown in FIG. 1, the seat 1 includes a seat body 3, on which a rider is to ride astride, and the backrest 4, which is arranged at a rear side of the seat body 3 to support the buttocks of the rider.

A first lighting device 6 is provided at a front portion of the seat body 3, and a riding surface area 3A on which the rider is to ride is provided at a rear portion of the seat body 3. The first lighting device 6 includes, for example, one or plural light sources such as light-emitting diodes (LEDs), and the lighting state of each of the light sources is controlled by a control unit (not shown). The first lighting device 6 may light in various light emitting modes, for example, by illuminating the whole thereof, illuminating the respective light sources so that light flows from front to rear, and by illuminating the respective light sources so that light flows from rear to front. In addition, the first lighting device 6 may include light sources of different colors and may be provided with a still further mode to emit lights of the different colors.

Further, as shown in FIG. 1, plural ride sensors 8 are arranged in the riding surface area 3A of the seat body 3. With the ride sensors 8, a mounted state of the rider on the riding surface area 3A can be detected. The ride sensors 8 are arranged between the surface material of the seat 1 and a urethane pad.

The backrest 4 is provided at a front portion thereof with a support area 4A to support the buttocks of the rider, and at a rear portion thereof with a second lighting device 7. Here, the second lighting device 7 may be configured to include, for example, one or plural light sources such as light-emitting diodes (LEDs), and the lighting state of each of the light sources may be controlled by the control unit (not shown). The second lighting device 7 may light in various light emitting modes, for example, by illuminating the whole thereof, illuminating the respective light sources so that light flows from front to rear, and by illuminating the respective light sources so that light flows from rear to front. In addition, the second lighting device 7 may include light sources of different colors and may be provided with a still further mode to emit light of the different colors.

As shown in FIG. 4, plural holes 4B are formed in a rear wall of the backrest 4. Tail lights 4C are arranged deep inside the holes 4B, respectively. The backrest 4 includes a first support surface 4D, a second support surface 4E, and a corner 4F where the first support surface 4D and the second support surface 4E are connected.

Further, as shown in FIG. 3, the seat body 3 and the backrest 4 are connected to each other by the link mechanisms 5 that are provided on a lower portion of the seat body 3. The backrest 4 can thus be moved upward or downward by the link mechanisms 5 while forming a pivotal trajectory with respect to the seat body 3. The structure of the link mechanisms 5 is described below in detail.

As shown in FIG. 5 to FIG. 7, the link mechanisms 5 are each configured as a portion of a four-bar parallel linkage mechanism including a first link 5A, a second link 5B, a third link 5C, and a fourth link 5D.

Each first link 5A is connected to its corresponding input shaft 50 that is rotatable about an axis thereof by an associated electric actuator 10A or 10B, thereby the first link 5A can rotate about the input shaft 50. It is noted that, when matters common to both the electric actuator 10A and the electric actuator 10B are described, the electric actuator 10A and the electric actuator 10B may be referenced to as "electric actuators 10".

Each electric actuator 10 has an electric motor to function as an actuating device for rotating the corresponding input shaft 50. The electric actuator 10 can rotate the input shaft 50 about the axis thereof in a normal direction (for example, in a clockwise direction) and in a reverse direction (for example, in a counterclockwise direction). These electric actuators 10 are arranged substantially symmetrically with respect to a center line in the width direction of the seat, and the two electric actuators 10 are arranged so that they flank the link mechanisms 5 from both sides.

Further, each electric actuator 10 has a Hall integrated circuit (IC). In synchronization with rotation of the associated motor, the Hall IC outputs a number of pulses corresponding to the rotation of the associated motor. The rotation angle of the motor can be detected on the basis of the number of pulses output from the hall IC of the electric actuator 10.

Furthermore, a cooling fan 13 is attached to each electric actuator 10. This electric actuator 10 is cooled as needed, thereby enabling its stable operation. The cooling fan 13 may be consistently operated, or may be operated only while the electric actuator 10 is operating or when the temperature of the electric actuator 10 has arisen to a predetermined value or higher.

As shown in FIG. 7, the first link 5A is connected, at an end portion thereof on a side opposite to the input shaft 50, to the third link 5C via a rotating shaft 51. As shown in FIG. 5 and FIG. 6, these first links 5A are arranged substantially symmetrically with respect to the center line in the width direction of the seat, and the two first links 5A are arranged so that they flank the sides of the third link 5C.

A protection plate 5E of a substantially semi-circular shape is attached to each first link 5A on a lower wall thereof as viewed in an up to down direction of the seat. Due to the arrangement of the protection plate 5E as described above, it is possible to avoid an accidental insertion of a hand into an inner space formed by the first link 5A, the second link 5B, the third link 5C, and the fourth link 5D when the link mechanism 5 is operated.

As shown in FIG. 6 and FIG. 7, the third link 5C is fixed at an upper end thereof, to a backrest attachment portion 12 which is a portion of an inner frame of the backrest 4. Further, the third link 5C is connected, at an opposite, i.e., lower end thereof, to the second link 5B via a rotary shaft 52. As described above, the third link 5C is also connected to each first link 5A via the rotary shaft 51 between both the ends of the third link 5C.

The second link 5B is a link which is arranged substantially in parallel with the first links 5A. The second link 5B is connected, at an end thereof, to the third link 5C via the rotary shaft 52, and is connected, at an opposite end thereof, to the fourth link 5D via a rotary shaft 53. The third link 5C (also referred to as "a bracket side link member") includes a front surface 5C1 and an upper end portion 5C2.

Each fourth link 5D is a link which is fixed to the seat body 3. This fourth link 5D is connected, via the corresponding input shaft 50, to the associated first link 5A and is connected, via the rotary shaft 53, to the second link 5B.

An upper limit switch 9A and a lower limit switch 9B are provided on outer walls, as viewed in the width direction of the seat, of the fourth links 5D, respectively. Operation of the upper limit switch 9A and lower limit switch 9B stop the movement of the backrest 4 by the link mechanisms 5 at the positions of the upper and lower height limits of the backrest 4. Specifically, at the position when the backrest 4 reaches the upper height limit, the upper limit switch 9A, which specifies the position at the upper limit, comes into contact with a portion of the associated one of the link mechanisms 5 (for example, the first link 5A on the side of the upper limit switch 9A), thereby the upper limit switch 5A is operated and the rotation of the input shafts 50 driven by the associated electric actuators 10 are stopped accordingly. At the position where the backrest 4 reaches the lower height limit, the lower limit switch 9B, which specifies the position at the lower limit, comes into contact with a portion of the other one of the link mechanisms 5 (for example, the first link 5A on the side of the lower limit switch 9B), thereby the lower limit switch 9B is operated and the rotation of the input shafts 50 driven by the associated electric actuators 10 are stopped.

Next, the aforementioned operation of each link mechanism 5 is described on the basis of the cross-sectional views of the seat frame 1A shown in FIG. 7 to FIG. 9.

FIG. 7 shows a state of one of the link mechanism 5 when the backrest 4 is at the lower limit position (i.e., at a retracted position). Here, the input shaft 50 and the rotary shaft 53 are fixed points while the rotary shaft 51 and the rotary shaft 52 are movable points.

As shown in FIG. 7, at a position where the seat body 3 and the backrest 4 are adjacent to each other, lower ends of the seat body 3 and backrest 4 are located on substantially the same level in the up to down direction. The first link 5A rotates about the input shaft 50, and therefore the position of the rotary shaft 51 changes. It is noted that during the movement of the backrest 4 from the lower limit position to the upper limit position, the position of the rotary shaft 51 moves upward as the rotary shaft 51 moves from the lower limit position to the upper limit position. θ1 in FIG. 7 indicates a first angle θ1 between an upper surface of the seat body 3 and the second support surface 4E.

When the electric actuator 10A next operates to rotate the input shaft 50 counterclockwise as seen in FIG. 7 (in other words, in a direction where the position of the rotary shaft 51 moves upward), the second link 5B and the third link 5C rotate, following the rotation of the first link 5A as shown in FIG. 8. Therefore, the position of the third link 5C moves upward and the backrest 4 fixed to the third link 5C moves upward while forming a pivotal trajectory with respect to the seat body 3.

After the electric actuator 10A then continuously operates to rotate the input shaft 50 counterclockwise, the operation of the electric actuator 10 stops when one of the following first, second, or third upward movement stopping conditions is satisfied.

The first upward movement stopping condition is that the backrest 4 reaches the upper limit position, in other words, the upper limit switch 9A is turned on.

The second upward movement stopping condition is that the number of output pulses synchronized with the rotation of the motor serving as a power source for the associated electric actuator 10 reaches an upper limit. It is noted that the number of output pulses is counted on the basis of an output from the Hall IC provided on the associated electric actuator 10.

The third upward movement stopping condition is that an overload on the motor serving as the power source for the associated electric actuator 10 is detected.

FIG. 9 illustrates a state of one of the link mechanisms 5 where the backrest 4 has reached the upper limit position. It is noted that the state shown in FIG. 9 corresponds to a case where the operation of the electric actuators 10 have stopped under the aforementioned first upward movement stopping condition. θ2 in FIG. 9 indicates a second angle θ2 between the upper surface of the seat body 3 and the second support surface 4E.

As shown in FIG. 9, at the upper limit position for the backrest 4, the seat body 3 and the backrest 4 are located at positions where they are substantially adjacent to each other. That is, in respective cases where the backrest 4 is at the lower limit position and at the upper limit position, a front end portion of the backrest 4 is substantially at the same position in the front to back direction of the seat.

In order to retract the backrest 4 (i.e., move the backrest 4 downward), the electric actuator 10A is operated from its position in the link mechanism 5 shown in FIG. 9 to rotate the input shaft 50 clockwise as seen in FIG. 9 (in other words, in a direction in which the rotary shaft 51 moves downward).

After the electric actuator 10A has then continuously operated to rotate the input shaft 50 clockwise, the operation of the electric actuator 10A stops when one of the following first or second downward movement stopping conditions is satisfied.

The first downward movement stopping condition is that the backrest 4 reaches the lower limit position, in other words, the lower limit switch 9B is turned on. For example, at the position of the backrest 4 shown in FIG. 7, the lower limit switch 9B operates and the operation of the electric actuator 10A stops.

The second downward movement stopping condition is that an overload on the motor serving as the power source for one of the electric actuators 10 is detected.

High torque is output from an electric motor even in a low speed range. When the opening degree (e.g., actuation degree) of an accelerator is increased in an automotive two-wheeled vehicle provided with the electric motor as a primary mover, a powerful acceleration can therefore be obtained even at a low speed. If the backrest 4 of the seat 1 provided on the aforementioned automotive two-wheeled vehicle is left in a lowered position upon acceleration of the automotive two-wheeled vehicle, the buttocks of the rider may, therefore, move rearward to fall off the rear portion of the seat body 3. If the backrest 4 is left in a raised position. On the other hand, the backrest 4 may obstruct the rider when he or she mounts or dismounts the seat 1.

In the seat 1 according to this embodiment, the backrest 4 is thus controlled to move upward or downward based on at least one of an acceleration of the automotive two-wheeled vehicle or operation information for controlling the acceleration.

In an example to be described below, a control unit 20 (e.g., electronic control unit ECU) for controlling driving of the motor as the primary mover for the automotive two-wheeled vehicle controls the operation of the electric actuators 10 on the basis of an opening degree of an accelerator 21 (one example of the operation information for controlling the acceleration), thereby controlling the link mechanisms 5 to control the upward or downward movement of the backrest 4. Functions of and processing by the control unit 20 are described below in detail on the basis of FIG. 10 to FIG. 15.

Figure 10:
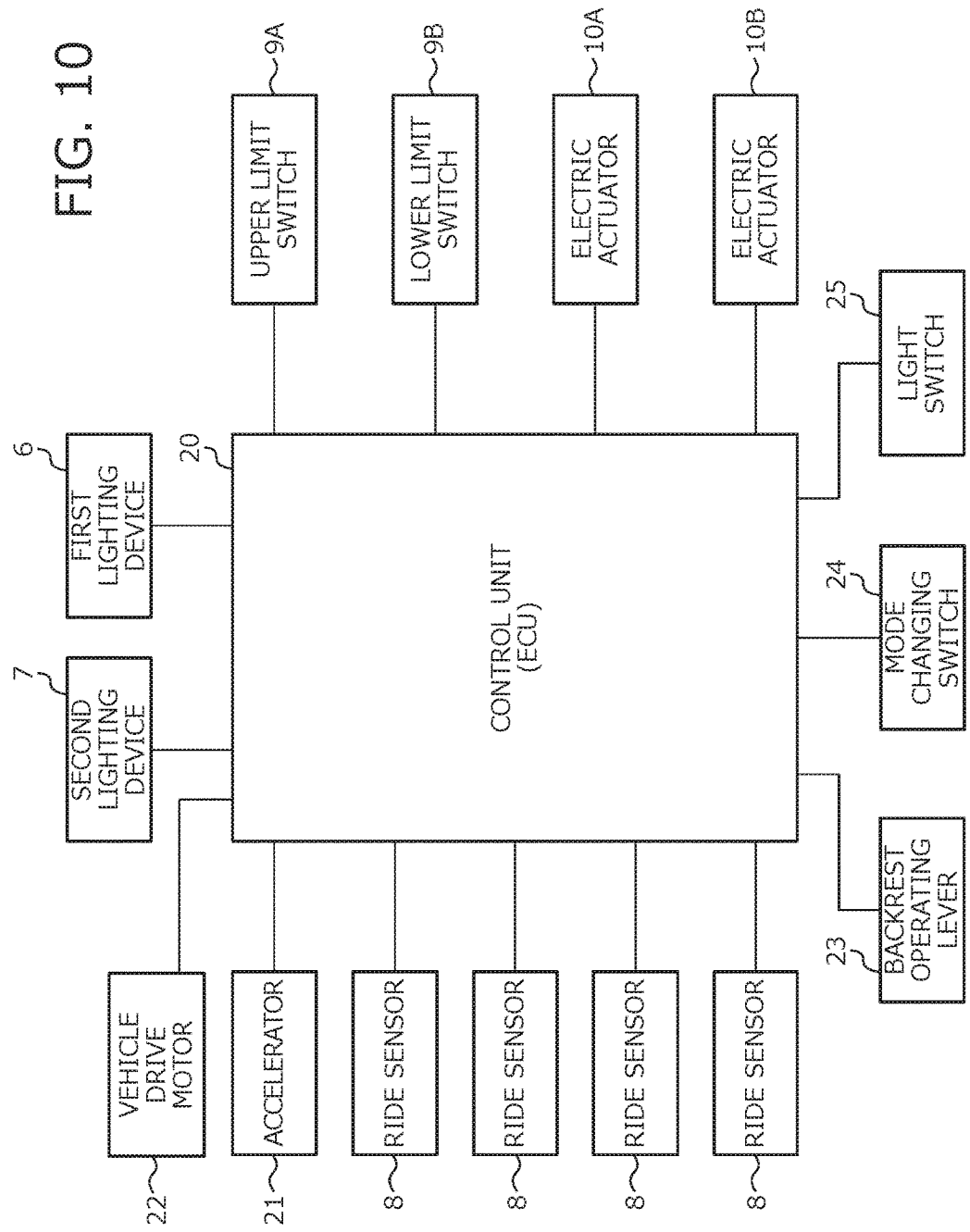
FIG. 10 is a configuration diagram of a control system in the seat for the automotive two-wheeled vehicle.

As shown in FIG. 10, the control unit 20 is connected to the first lighting device 6, the second lighting device 7, the ride sensors 8, the upper limit switch 9A, the lower limit switch 9B, the electric actuator 10A, the electric actuator 10B, the accelerator 21, a vehicle drive motor 22, a backrest operating lever 23, a mode changing switch 24, and a light switch 25 to communicate with each of these elements and to control it.

The control unit 20 detects signals, which indicate a riding state of a rider, from, for example, two of the ride sensors 8, and on the basis of the signals, determines a state that the rider has mounted the seat 1. When the mounted state of the rider has been determined, the control unit 20 may, for example, cause the first lighting device 6 and the second lighting device 7 to light up. When the mounted state of the rider is determined to no longer exist on the basis of no input of detection signal from any of the ride sensors 8, on the other hand, the control unit 20 may, for example, have the first lighting device 6 and the second lighting device 7 turned off.

Further, the control unit 20 detects an opening (e.g., an actuation amount from 0% to 100%) of the accelerator 21 as an operation signal and controls a voltage to be supplied to the vehicle drive motor 22 based on the opening degree of the accelerator 21. Therefore, the control unit 20 can control the output of the vehicle drive motor 22 based on the opening degree of the accelerator 21. Specifically, the control unit 20 may be configured to perform the control so that, as the opening of the accelerator 21 becomes larger, it increases the voltage to be supplied to the vehicle drive motor 22 and increases the output of the vehicle drive motor 22. That is, the vehicle is controlled to be accelerated further as the opening degree of the accelerator 21 increases.

Furthermore, the control unit 20 controls the operation of the electric actuators 10 on the basis of the opening degree of the accelerator 21, whereby controlling the upward or downward movement of the backrest 4. The control of the upward or downward movement of the backrest 4 by the control unit 20 on the basis of the opening degree of the accelerator 21 is described below in detail on the basis of the flow charts shown in FIG. 12 to FIG. 14.

Furthermore, the control unit 20 may detect an operation signal (a deployment operation or a retraction operation of the backrest 4) from the backrest operating lever 23 to control the upward or downward movement of the backrest 4 on the basis of the operation signal detected. The control of the upward or downward movement of the backrest 4 by the control unit 20 on the basis of the operation signal from the backrest operating lever 23 is described below in detail on the basis of the flow chart shown in FIG. 15.

An example of processing by the control unit 20 is described below on the basis of the flow charts shown in FIG. 11 to FIG. 15. In the example described below, an automatic mode (corresponding to a case where the mode changing switch 24 is off) in which the movement of the backrest 4 is not controlled by a rider but is automatically controlled is set as a default. When the mode changing switch 24 is operated to switch from the automatic mode to a manual mode (corresponding to a case where the mode changing switch 24 is on), the movement of the backrest 4 is controlled by operation of the backrest operating lever 23 conducted by the rider.

Figure 11:
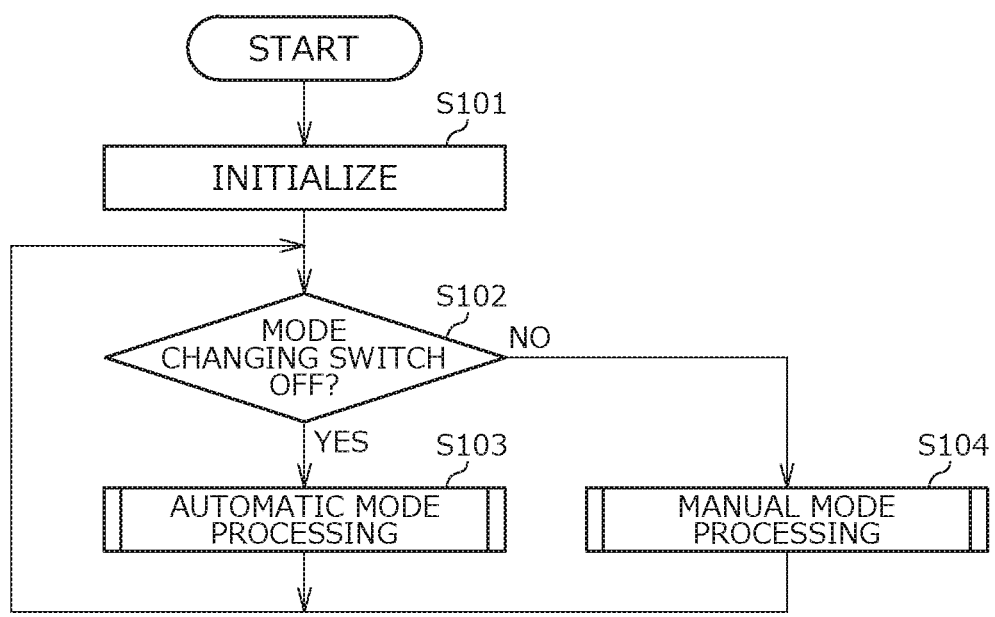
FIG. 11 is a flow chart of control processing by a control unit.

As shown in FIG. 11, when a power source of the automotive two-wheeled vehicle is turned on, the control unit 20 executes initialization on the basis of a control program (S101). When the mode changing switch 24 is off (YES in S102), the control unit 20 processes the control for lighting up the first lighting device 6 and the second lighting device 7 and the control for moving the backrest 4 in the automatic mode (S103). When the mode changing switch 24 is on (NO in S102), on the other hand, the control unit 20 processes the control for lighting up the first lighting device 6 and the second lighting device 7 and the control for moving the backrest 4 in the manual mode (S104).

Figure 12:
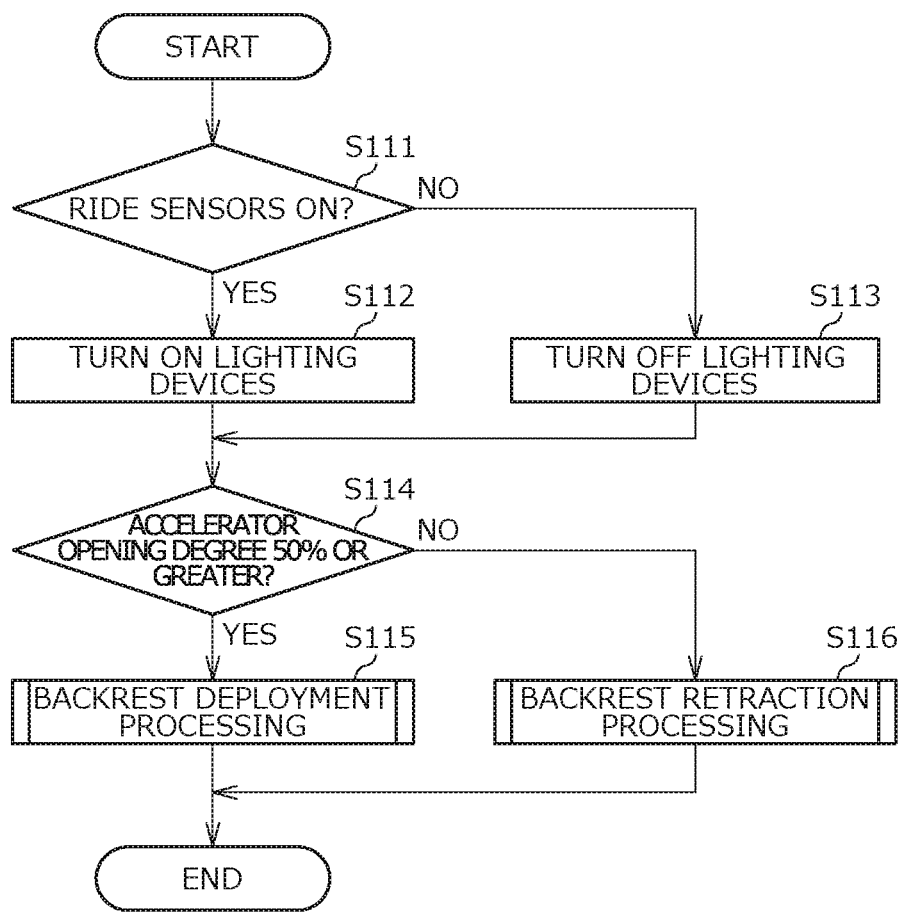
FIG. 12 is a flow chart of control processing by the control unit in an automatic mode.

Next, the control processing in the automatic mode (S103) is described on the basis of the flow chart shown in FIG. 12. Here, it is assumed that in an initial state, the backrest 4 is at the retracted position (in other words, the lower limit position) shown in FIG. 7.

As shown in FIG. 12, when, for example, two or more of the ride sensors 8 are on (YES in S111), the control unit 20 causes the first lighting device 6 and the second lighting device 7 to light up (step S112). When all the ride sensors 8 are off (NO in S111), on the other hand, the control unit 20 causes the first lighting device 6 and the second lighting device 7 to be turned off (S113).

Next, when the opening degree of the accelerator 21 is equal to or greater than a threshold (for example, 50%) (YES in S114), the control unit 20 executes deployment processing for the backrest 4 (in other words, the processing for controlling the backrest to move upward) (S115) and ends the processing. When the opening degree of the accelerator 21 is below the threshold (NO in S114), on the other hand, the control unit 20 executes retraction processing for the backrest 4 (in other words, the processing for controlling the backrest to move downward) (S116) and ends the processing.

Figure 13:
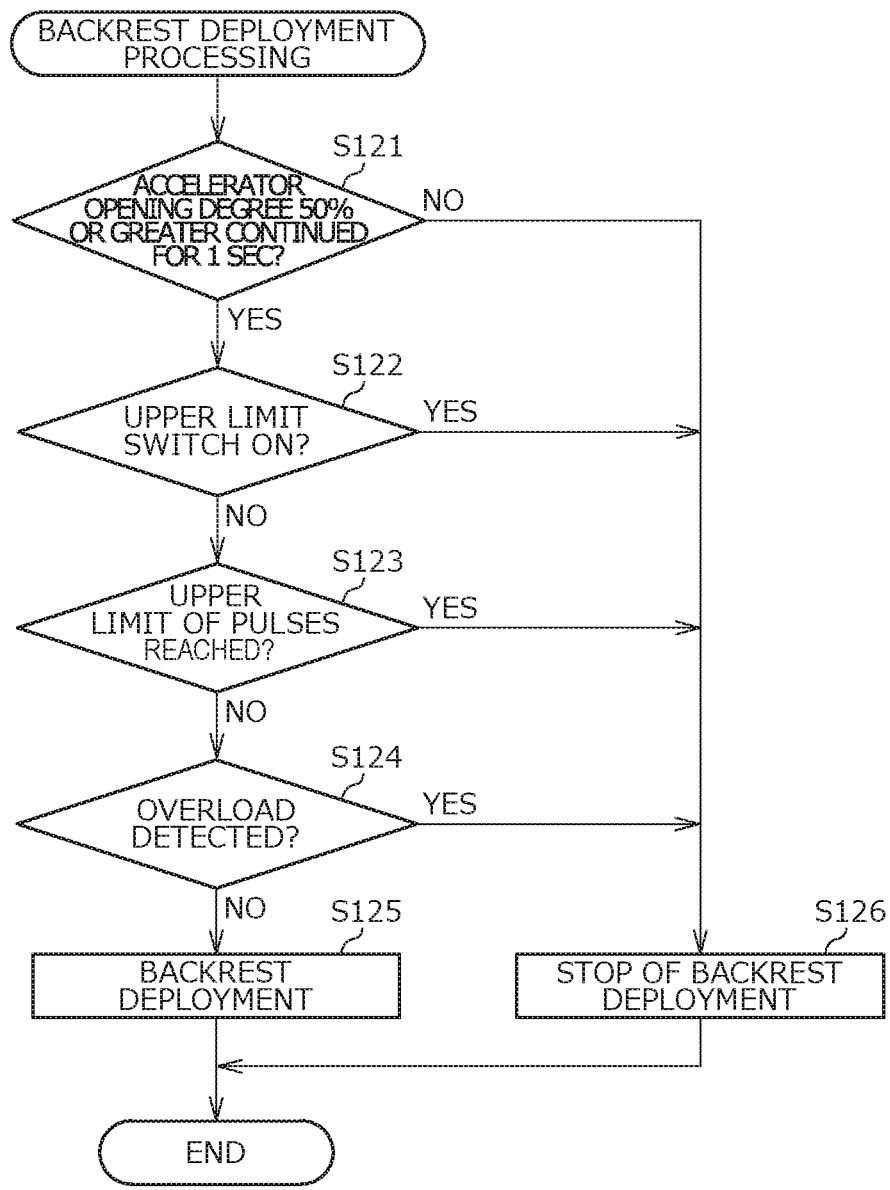
FIG. 13 is a flow chart of backrest deployment processing by the control unit.

Here, the deployment processing for the backrest 4 (S115) is described in detail on the basis of the flow chart shown in FIG. 13.

As shown in FIG. 13, when the period of time during which the opening degree of the accelerator 21 is equal to or greater than the threshold (for example, 50%) is not equal to or longer than a predetermined time (for example, one second) (NO in S121), the control unit 20 stops the deployment of the backrest 4 (S126) and ends the processing.

The control unit 20 receives pulse signals, which are synchronized with rotation of the motor, from the Hall IC provided on the one of the electric actuators 10 and controls the operation of the electric actuators 10. In order to stop the aforementioned deployment of the backrest 4, the control unit 20 may, for example, control and stop the operation of the electric actuators 10. Alternatively, the supply of power to the electric actuators 10 may be stopped, or the electric actuators 10 may autonomously stop to operate. When the control unit 20 controls and stops the electric actuators 10, on the other hand, the control unit 20 may, for example, send a signal which instructs to decrease the amount of operation to zero (for example, a signal which instructs to decrease the rotation angle of each motor for the associated electric actuator 10 to zero). Alternatively, the control unit 20 may stop to send a signal, which instructs an amount of operation, to the electric actuators 10.

When the period of time during which the opening degree of the accelerator 21 is equal to or greater than the threshold (for example, 50%) is equal to or longer than the predetermined time (for example, one second) in step S121 described above (YES in S121), on the other hand, the processing of the control unit 20 advances to step S122.

When the upper limit switch 9A is on (in other words, has been actuated) in step S122 (YES in S122), the control unit 20 stops the deployment of the backrest 4 (S126) and ends the processing. In this case, the stop of the deployment of the backrest 4 may be performed by allowing the upper limit switch 9A to cut off the supply of power to the electric actuators 10.

When the upper limit switch 9A is off (in other words, has not been actuated) in step S122 described above (NO in S122), on the other hand, the processing of the control unit 20 advances to step S123.

When the number of output pulses synchronized with the rotation of the motor for the one of the electric actuators 10 has reached the upper limit in step S123 (YES in S123), the control unit 20 stops the deployment of the backrest 4 (S126) and ends the processing. When the number of output pulses synchronized with the rotation of the motor for one of the electric actuators 10 has not reached the upper limit in step S123 (NO in S123), the processing of the control unit 20 advances to step S124. It is noted that the rotation angle of the motor (in other words, the rotation angle of the associated input shaft 50) is proportional to the number of output pulses.

When an overload has been detected on the motor for the one of the electric actuators 10 in step S124 (YES in S124), the control unit 20 stops the deployment of the backrest 4 (S126) and ends the processing. When no overload has been detected on the motor for the one of the electric actuators 10 (NO in S124), the control unit 20 executes the deployment (upward movement) of the backrest 4 (S125) and ends the processing. It is noted that the control unit 20 may be configured to allow the electric actuators 10 to operate until one of the conditions in steps S122 to S124 is satisfied (in other words, until one of the conditions is determined to be YES) upon deployment of the backrest 4 as mentioned above.

According to the processing described above, the backrest 4 can be moved upward in an acceleration state that the opening degree of the accelerator 21 is maintained at a value equal to or greater than the threshold (for example, 50%). The backrest 4 can then be automatically and safely stopped by stopping the upward movement of the backrest 4 based on the result of a determination in one of steps S122 to S124.

Figure 14:
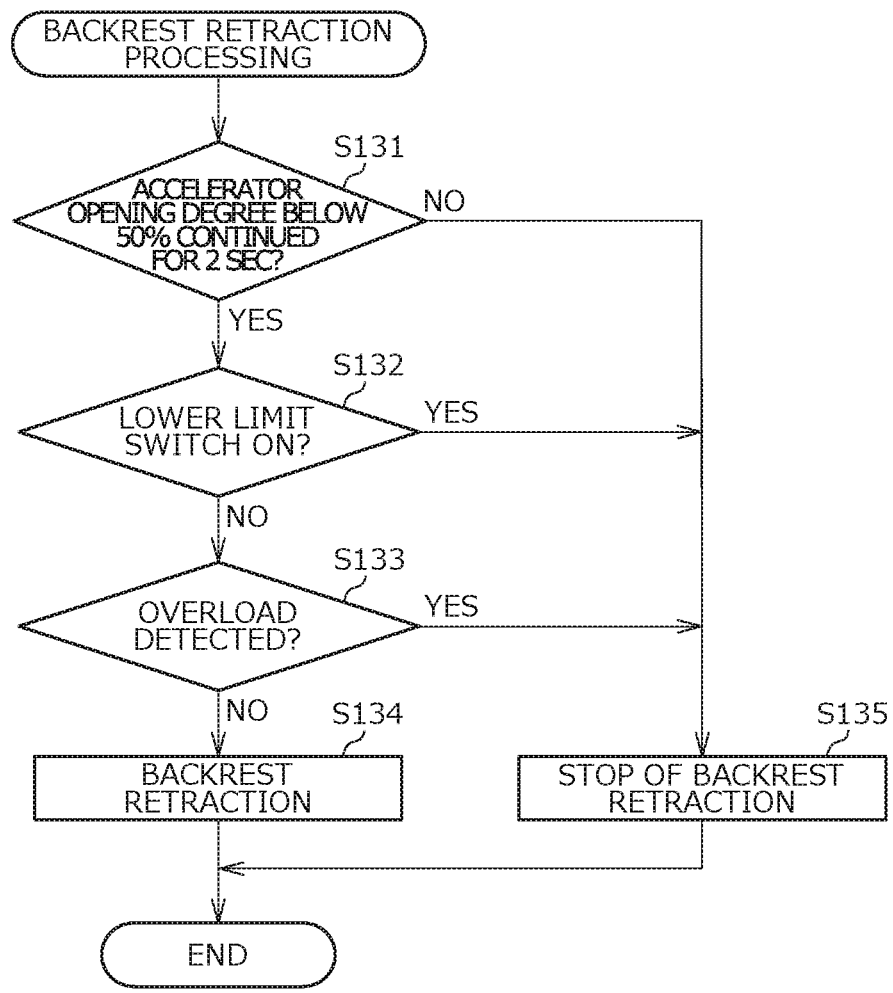
FIG. 14 is a flow chart of backrest retraction processing by the control unit.

Next, the retraction processing of the backrest 4 (S116) is described in detail on the basis of the flow chart shown in FIG. 14. It is noted that the retraction processing of the backrest 4 is processing for moving the backrest 4 downward. Specifically, the retraction processing of the backrest 4 can be performed by rotating the motors for the electric actuators 10 in a direction reverse to a direction at the time of the deployment processing for the backrest 4.

As shown in FIG. 14, when the period of time during which the opening degree of the accelerator 21 is below the threshold (for example, 50%) has not continued for a predetermined time (for example, two seconds) (NO in S131), the control unit 20 stops the retraction of the backrest 4 (S135) and ends the processing. The above-described stop of the retraction of the backrest 4 can be controlled in the same way as the stop of the deployment of the backrest 4.

When the period of time during which the opening degree of the accelerator 21 is below the threshold (for example, 50%) has continued for the predetermined time (for example, two seconds) in step S131 described above (YES in S131), on the other hand, the processing of the control unit 20 advances to step S132.

When the lower limit switch 9B has been turned on (in other words, has been actuated) in step S132 (YES in S132), the control unit 20 stops the retraction of the backrest 4 (S135) and ends the processing. In this case, the stop of the retraction of the backrest 4 may be performed by allowing the lower limit switch 9B to cut off the supply of power to the electric actuators 10.

When the lower limit switch 9B is off (in other words, has not been actuated) in step S132 described above (NO in S132), on the other hand, the processing of the control unit 20 advances to step S133.

When an overload has been detected on the motor for the one of the electric actuators 10 in step S133 (YES in S133), the control unit 20 stops the retraction of the backrest 4 (S135) and ends the processing. When no overload has been detected on the motor for the one of the electric actuators 10 (NO in S133), on the other hand, the control unit 20 executes the retraction (downward movement) of the backrest 4 (S134) and ends the processing. The control unit 20 may be configured to allow the electric actuators 10 to operate until one of the conditions in steps S132 and S133 is satisfied (in other words, until one of the conditions is determined to be YES) upon retraction of the backrest 4 as mentioned above.

The backrest 4 can be retracted by the processing described above when both the period where the opening degree of the accelerator 21 is below the threshold (for example, 50%) continues and the automotive two-wheeled vehicle is not in a constant acceleration state.

As described above, in the seat 1 according to this embodiment, the position of the backrest 4 is automatically controlled based on the opening degree of the accelerator 21. Especially when the vehicle is brought into an accelerating state, the backrest 4 is moved upward and the buttocks of the rider can be surely supported from the rear of the rider. Even upon rapid acceleration of the vehicle, the buttocks of the rider can be prevented from moving rearward. When the vehicle is not in an accelerating state, on the other hand, the backrest 4 is retracted downward, and therefore the backrest 4 does not obstruct the rider when he or she mounts or dismounts the seat.

Figure 15:
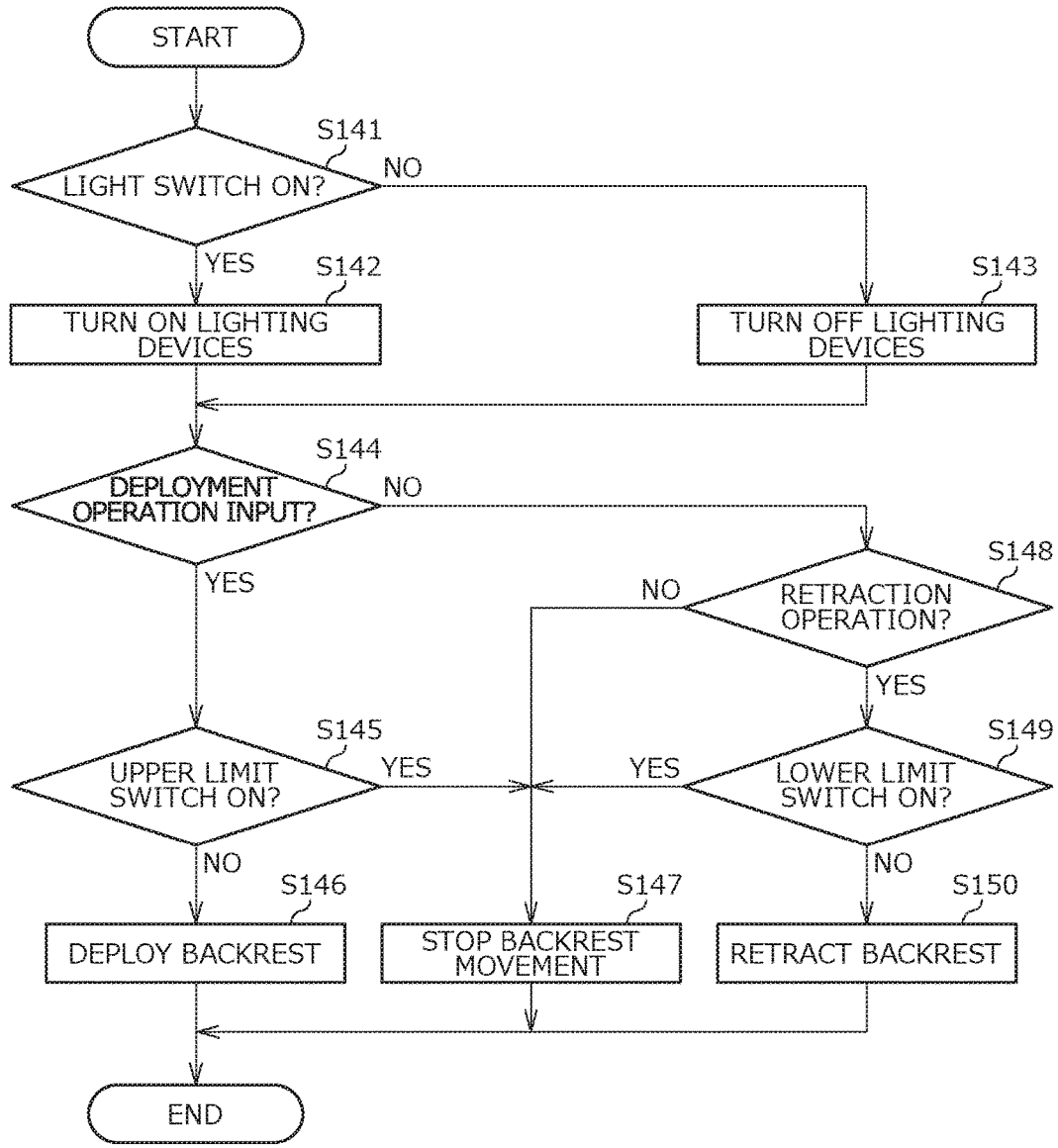
FIG. 15 is a flow chart of control processing by the control unit in a manual mode.

Next, the control processing in the manual mode (S104) is described in detail on the basis of the flow chart shown in FIG. 15.

As shown in FIG. 15, when the light switch 25 is on (YES in S141), the control unit 20 causes the first lighting device 6 and the second lighting device 7 to light up (S142). When the light switch 25 is off (NO in S141), the control unit 20 has the first lighting device 6 and the second lighting device 7 turned off (S143).

Next, when the deployment operation has been input by the backrest operating lever 23 (YES in S144) and the upper limit switch 9A specifying the upper limit position of the backrest 4 is not on (NO in S145), the control unit 20 executes the deployment (upward movement) of the backrest 4 (S146) and ends the processing.

When the upper limit switch 9A is on in step S145 (YES in S145), the control unit 20 stops the movement of the backrest 4 (S147) and ends the processing.

When the operation input by the backrest operating lever 23 in step S144 is not a deployment operation (NO in S144) but is a retraction operation (YES in S148), the processing advances to step S149. Then, when the lower limit switch 9B specifying the lower limit position of the backrest 4 is not on in step S149 (NO in S149), the control unit 20 executes retraction (downward movement) of the backrest 4 (S150) and ends the processing.

When the operation input by the backrest operating lever 23 in step S148 is not a retraction operation (NO in S148) or when the lower limit switch 9B is on in step S149 (YES in S149), the control unit 20 stops the movement of the backrest 4 (S147) and ends the processing.

As described above, after the switching from the automatic mode to the manual mode by the mode changing switch 24, the backrest 4 can be manually operated by operating the backrest operating lever 23. Here, the backrest 4 may be configured to stop at a position corresponding to an amount or duration of operation of the backrest operating lever 23. The seat 1 may also be configured to move the backrest 4 to the upper limit position when a deployment operation is input by the backrest operating lever 23, but to move the backrest 4 to the lower limit position when a retraction operation is input by the backrest operating lever 23.

The above-described embodiment is merely an example for facilitating the understanding of the present disclosure and does not restrict the present disclosure. The present disclosure may be changed or modified without departing from the spirit of the present disclosure, and encompasses equivalents thereof.

For example, the upward or downward movement of the backrest 4 may be controlled on the basis of an acceleration of the vehicle instead of an opening degree of the accelerator 21. For example, the control unit 20 may be configured to move the backrest 4 upward when the period of time during which the acceleration of the vehicle is equal to or greater than the threshold is equal to or longer than a predetermined time (for example, one second). For example, the control unit 20 may be configured to move the backrest 4 downward when the period of time during which the acceleration of the vehicle is below the threshold has continued for a predetermined time (for example, two seconds) or longer. The control unit 20 may acquire an acceleration of the vehicle from an acceleration sensor or by computing it based on a speed of the vehicle.

The control unit 20 may have at least one of the first lighting device 6 and the second lighting device 7 lit up while the backrest 4 is moved upward or is moved downward. In this case, the light emitting mode may be changed between the period during which the backrest 4 is moved upward and the period during which the backrest 4 is moved downward. In this manner, it is possible to notify the rider whether the backrest 4 is moving upward or downward.

The mechanism for moving the backrest 4 upward and downward is not limited to the link mechanisms 5. For example, a slide mechanism for sliding the backrest 4 upward and downward may be implemented in other embodiments.

The present disclosure can be applied not only to an automotive two-wheeled vehicle but also to a vehicle provided with a straddle-type seat, such as an automotive three-wheeled vehicle, a jet ski bike or a snowmobile.

What is claimed is:

1. A straddle-type seat to be provided on a vehicle, comprising:
   a seat body on which a rider is to ride;
   a backrest arranged at a rear side of the seat body; and
   an electric upward and downward movement mechanism configured to move the backrest upward or downward based on at least one of an acceleration of the vehicle or operation information for controlling the acceleration;
   wherein the backrest comprises:
      a first support surface configured to support the rider when the backrest is at a lower limit position; and
      a second support surface configured to support the rider when the backrest is at an upper limit position;
   wherein a first angle between an upper surface of the seat body and the first support surface is different from a second angle between the upper surface of the seat body and the second support surface.

2. The straddle-type seat according to claim 1, wherein the upward and downward movement mechanism comprises:
   a link mechanism that connects a lower portion of the seat body with the backrest; and
   an electric actuator configured to input force to at least one of links included in the link mechanism.

3. The straddle-type seat according to claim 2, wherein the link mechanism is configured to move the backrest upward or downward so that the backrest moves along a pivotal trajectory with respect to the seat body.

4. The straddle-type seat according to claim 3, wherein the backrest is substantially at a same position in a front to back direction in respective cases where the backrest is at the upper limit position and at the lower limit position.

5. The straddle-type seat according to claim 2, wherein:
   the link mechanism comprises a backrest side link member connected to the backrest; and
   the backrest side link member comprises a front face of the backrest side link member in a seat front to back direction; and
   a part of the front face of the backrest side link member is substantially parallel to the first support surface.

6. The straddle-type seat according to claim 2, wherein:
   the link mechanism comprises a backrest side link member connected to the backrest; and
   the backrest side link member comprises an upper end portion provided above a corner where the first support surface and the second support surface are connected.

7. The straddle-type seat according to claim 1, wherein the operation information for controlling the acceleration is an opening degree of an accelerator of the vehicle.

8. The straddle-type seat according to claim 7, wherein:
   when the opening degree of the accelerator is equal to or greater than a threshold, the upward and downward movement mechanism starts an upward movement of the backrest, and
   when a predetermined upward movement stopping condition is satisfied, the upward and downward movement mechanism stops the upward movement of the backrest.

9. The straddle-type seat according to claim 8, wherein the predetermined upward movement stopping condition is at least one of conditions that an upper limit switch for the backrest is turned on, that the number of output pulses synchronized with rotation of a motor as a primary mover for the upward and downward movement mechanism reaches an upper limit, or that an overload on the motor is detected.

10. The straddle-type seat according to claim 7, wherein:
    when a state in which the opening degree of the accelerator is below a threshold continues for a predetermined time, the upward and downward movement mechanism starts a downward movement of the backrest, and
    when a predetermined downward movement stopping condition is satisfied, the upward and downward movement mechanism stops the downward movement of the backrest.

11. The straddle-type seat according to claim 10, wherein the predetermined downward movement stopping condition is at least one of conditions that a lower limit switch for the backrest is turned on or that an overload on a motor as a primary mover for the upward and downward movement mechanism is detected.

12. A straddle-type seat to be provided on a vehicle, comprising:
- a seat body on which a rider is to ride;
- a backrest arranged at a rear side of the seat body; and
- an electric upward and downward movement mechanism configured to move the backrest upward or downward based on at least one of an acceleration of the vehicle or operation information for controlling the acceleration;

wherein:
- the upward and downward movement mechanism comprises:
  - a link mechanism that connects a lower portion of the seat body with the backrest; and
  - an electric actuator configured to input force to at least one of links included in the link mechanism; and
- wherein the link mechanism connects the electric actuator with the backrest, and the electric actuator is attached to the seat body.

13. The straddle-type seat according to claim 12, wherein the link mechanism is configured to move the backrest upward or downward so that the backrest moves along a pivotal trajectory with respect to the seat body.

14. The straddle-type seat according to claim 13, wherein the backrest is substantially at a same position in a front to back direction in respective cases where the backrest is at an upper limit position and at a lower limit position.

15. The straddle-type seat according to claim 12 wherein the operation information for controlling the acceleration is an opening degree of an accelerator of the vehicle.

16. The straddle-type seat according to claim 15, wherein:
- when the opening degree of the accelerator is equal to or greater than a threshold, the upward and downward movement mechanism starts an upward movement of the backrest, and
- when a predetermined upward movement stopping condition is satisfied, the upward and downward movement mechanism stops the upward movement of the backrest.

17. The straddle-type seat according to claim 16, wherein the predetermined upward movement stopping condition is at least one of conditions that an upper limit switch for the backrest is turned on, that the number of output pulses synchronized with rotation of a motor as a primary mover for the upward and downward movement mechanism reaches an upper limit, or that an overload on the motor is detected.

18. The straddle-type seat according to claim 15, wherein:
- when a state in which the opening degree of the accelerator is below a threshold continues for a predetermined time, the upward and downward movement mechanism starts a downward movement of the backrest, and
- when a predetermined downward movement stopping condition is satisfied, the upward and downward movement mechanism stops the downward movement of the backrest.

19. The straddle-type seat according to claim 18, wherein the predetermined downward movement stopping condition is at least one of conditions that a lower limit switch for the backrest is turned on or that an overload on a motor as a primary mover for the upward and downward movement mechanism is detected.

* * * * *